United States Patent [19]

Ekbom

[11] 4,445,259
[45] May 1, 1984

[54] METHOD OF MANUFACTURING BLADED ELEMENTS FOR ROTARY FLUID MACHINES

[75] Inventor: Ragnar Ekbom, Finspong, Sweden

[73] Assignee: Stal-Labal Turbin AB, Finspong, Sweden

[21] Appl. No.: 407,989

[22] Filed: Aug. 13, 1982

[30] Foreign Application Priority Data

Aug. 27, 1981 [SE] Sweden ................. 8105073

[51] Int. Cl.³ ................. B21K 3/04; B23P 15/02; B23P 15/04
[52] U.S. Cl. ................. 29/156.8 B; 419/8; 419/49; 416/213 R; 416/244 A
[58] Field of Search ................. 29/156.8 B, 156.8 R, 29/156.8 T, 423, 462, 463, 455 R, 157 R, 157 C, 156.8 CF; 228/182, 193, 183, 243; 419/8, 49; 416/210 R, 211, 213 R, 219 R, 234, 244 A; 264/263, 109

[56] References Cited

U.S. PATENT DOCUMENTS

| | | | |
|---|---|---|---|
| 1,284,088 | 11/1918 | Gilson | 29/156.8 B |
| 1,470,497 | 10/1923 | Steenstrup | 228/182 X |
| 1,641,745 | 9/1927 | Dimberg | 228/182 X |
| 2,373,558 | 10/1942 | Haigh | 228/182 X |
| 2,717,554 | 9/1955 | Stalker | 29/156.8 R X |
| 3,357,082 | 12/1967 | Beaney | 29/156.8 CF |
| 3,550,234 | 12/1970 | Herold | 228/182 X |
| 3,613,227 | 10/1971 | Parko | 264/263 X |
| 4,048,273 | 9/1977 | Pryce-Jones | 264/263 X |
| 4,063,939 | 12/1977 | Weaver et al. | 29/156.8 R X |
| 4,096,615 | 6/1978 | Cross | 29/156.8 R |
| 4,097,276 | 6/1978 | Six | 419/8 |
| 4,142,888 | 3/1979 | Rozmus | 264/109 X |
| 4,152,816 | 5/1979 | Ewing et al. | 228/193 X |
| 4,270,256 | 6/1981 | Ewing | 29/156.8 R |

FOREIGN PATENT DOCUMENTS 1542895 3/1979 United Kingdom .

*Primary Examiner*—Charlie T. Moon
*Assistant Examiner*—Ronald S. Wallace
*Attorney, Agent, or Firm*—Pollock, Vande Sande & Priddy

[57] ABSTRACT

A method of manufacturing a bladed element of a rotary fluid machine, for example a turbine or compressor, includes the steps of securing a plurality of blades in a gas-tight manner in respective openings in a wall of a hollow casing with one end of each blade in the hollow interior of the casing and the remainder of the blade externally of the casing, filling the casing with powder which surrounds the blade ends within the casing, hermetically sealing the casing, and isostatically pressing the casing around the blade ends in order to form the casing, the powder and the blade ends into a monolithic body.

5 Claims, 4 Drawing Figures

METHOD OF MANUFACTURING BLADED ELEMENTS FOR ROTARY FLUID MACHINES

TECHNICAL FIELD

This invention relates to a method of manufacturing a bladed element, for example a blade ring, a guide vane ring or a bladed disc, of a rotary fluid machine, for example a turbine or a compressor.

TECHNICAL BACKGROUND

Blade rings, guide vane rings and bladed discs for rotary fluid machines can be manufactured either by milling away material from solid rings or discs, so as to form blades which are integral with the rings or discs, or by attaching separately fabricated blades in rings or discs. In both cases great precision and expensive machining methods are required. Especially when manufacturing bladed turbine discs for radial turbines, the attachment of blades to a disc involves considerable problems because of the great outwardly-directed forces to which the blades are subjected during rotation of the turbine. The machining of the blade foot and the slot therefor in the turbine disc is especially time-consuming and expensive.

The present invention aims to provide a method of manufacturing bladed elements of the aforementioned kind which eliminates the expensive milling and machining operations which have had to be performed hitherto when manufacturing such elements, thus achieving lower manufacturing costs.

DISCLOSURE OF THE INVENTION

According to the invention, a method of manufacturing a bladed element of a rotary fluid machine is characterised by the steps of securing a plurality of blades in gas-tight manner in respective openings in a wall of a hollow casing, with one end of each blade in the hollow interior of the casing and the remainder of the blade externally of the casing, filling the casing with powder which surrounds the blade ends within the casing, hermetically sealing the casing, and isostatically pressing the casing around the blade ends to form the casing, the powder and the blade ends into a monolithic body.

Preferably, after filling of the casing with the powder, which may be a powdered metal or alloy, and prior to hermetically sealing the casing, the casing and the powder contained therein are de-gassed, suitably at an elevated temperature.

When the powder employed is a powdered steel alloy with nitrogen as an alloying component, the casing may be filled with nitrogen gas prior to sealing of the casing. This gas serves as a heat transfer medium during the pressing operation and becomes included in the pressed product.

By employing the method in accordance with the invention, the blades, which may penetrate about 10 mm into the interior of the casing, are joined into a homogeneous unit with the powder in the casing, with an exceptionally good, resistant bond between the blades and the powder. Furthermore, the pressed product requires very little machining to provide the finished bladed element.

BRIEF DESCRIPTION OF THE DRAWING

The invention will now be described in greater detail, by way of example, with reference to the accompanying drawing, in which.

DESCRIPTION OF PREFERRED EMBODIMENTS

Figure 1:
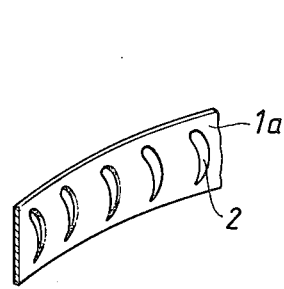
FIG. 1 is a perspective view of part of a circular cylindrical wall forming part of a guide vane ring or blade ring of an axial turbine or axial compressor.
Figure 2:
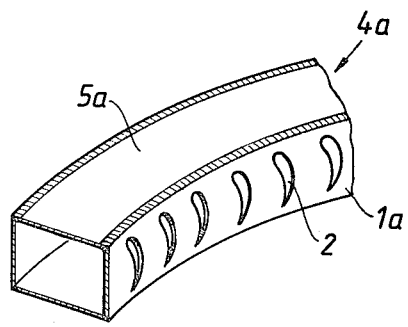
FIG. 2 is a perspective view of part of an annular casing comprising the wall of FIG. 1.
Figure 3:
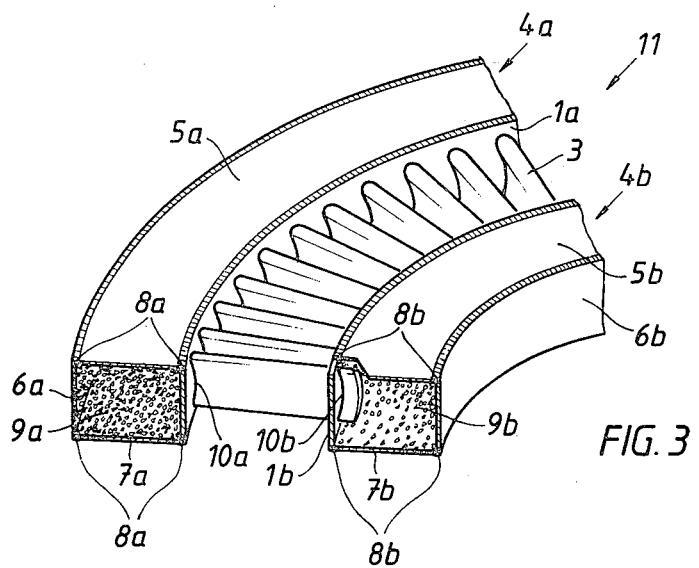
FIG. 3 is a perspective view of part of a guide vane or blade ring of an axial turbine or axial compressor which includes the casing of FIG. 2.

FIGS. 1 to 3 illustrate the manufacture of a blank for a guide vane ring or a blade ring of an axial turbine or axial compressor. This blank, which is generally designated by the numeral 11 in FIG. 3, comprises outer and inner annular casings 4a and 4b, respectively, and blades 3.

The casing 4a comprises a radially inner, circular cylindrical wall 1a, a short length of which is shown in FIG. 1. The wall 1a has a series of holes 2 formed therein, for the reception of the radially outer ends of the blades 3, these holes having the same shape as the radially outer ends of the blades. The casing 4a also comprises a radially outer, circular cylindrical wall 6a and two annular side walls 5a and 7a.

The casing 4b comprises a radially outer, circular cylindrical wall 1b which also has a series of holes (not shown) formed therein, similar to the holes 2 in the wall 1a, for the reception of the radially inner ends of the blades 3, these holes having the same shape as the radially inner ends of the blades. The casing 4b also comprises a radially inner, circular cylindrical wall 6b and two annular side walls 5b and 7b.

In order to make the blank 11, the wall 1b is first arranged concentrically inside the wall 1a, so that an annular gap is formed between the two walls and so that each hole 2 in the wall 1a is substantially radially aligned with a respective similar hole in the wall 1b. A respective blade 3 is then mounted in each pair of radially aligned holes in the two walls 1a and 1b. Each of the blades 3 has a length greater than the radial width of the annular gap between the walls 1a and 1b, so that, when a blade has been mounted in the two walls 1a and 1b, its radially outer end is situated radially outside the wall 1a and its radially inner end is situated radially inside the wall 1b (as can be seen in FIG. 3 in respect of the wall 1b).

The blades 3 are then welded to the wall 1a around the holes 2 by welds 10a and to the wall 1b, around the blade-receiving holes therein, by welds 10b. The welds 10a and 10b may be formed on one or both sides of the walls 1a and 1b, and provides a gas-tight connection between the blades 3 and the walls 1a and 1b.

The casing 4a is then completed by assembling the walls 5a, 6a and 7a with the wall 1a and joining the walls together, in a gas-tight manner, by welds 8a. In like manner, the casing 4b is completed by assembling the walls 5b, 6b and 7b with the wall 1b and joining the walls together, in a gas-tight manner, by welds 8b. When the casings 4a and 4b have been assembled in this way, it will be appreciated that the radially outer ends of the blades 3 are disposed inside the hollow casing 4a and the radially inner ends of the blades are disposed inside the hollow casing 4b.

After the welds 8a, 8b, 10a and 10b have been tested for gas-tightness, the casings 4a and 4b are filled with metallic powder 9a and 9b, respectively, through one or more filling openings (not shown) in the casings, whereafter the powder in the casings is de-gassed, for example via the filling openings, suitably at a somewhat elevated temperature. In this way the ends of the blades 3 become embedded in the metallic powder in the two casings.

The two casings 4a and 4b are then hermetically sealed and are isostatically hot pressed in known manner in a pressure furnace employing a gaseous pressure medium at such a temperature and such a pressure that the powder grains are bonded to each other and to the ends of the blades 3 which project into the powder, thus forming a monolithic body. After this pressing operation, any necessary machining to the desired dimensions of the finished guide vane ring or blade ring is carried out.

The procedure described above with reference to FIGS. 1 to 3 is an example of the use of the method in accordance with the invention for the manufacture of blade rings or guide vane rings for axial flow rotary fluid machines, such as axial turbines and axial compressors. When manufacturing blade rings or guide vane rings for radial flow rotary fluid machines, for example radial turbines, substantially the same procedure is employed, but the two casings 4a and 4b have substantially the same dimensions and, in the finished blank, are spaced apart in the axial direction of the machine. The ends of the blades 3 are received in holes (similar to the holes 2) in two opposed side walls of the casing, for example in the walls 5b and 7b, so that in the assembled blank the blades are disposed with their axes in the axial direction of the machine. Apart from this difference, the procedure is the same as described with reference to FIGS. 1 to 3.

Figure 4:
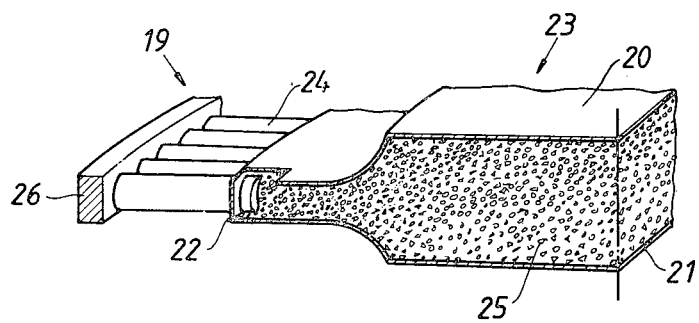
FIG. 4 is a view similar to FIG. 3 showing part of a bladed disc of an axial turbine.

FIG. 4 illustrates the manufacture of a blank, generally designated by the numeral 19, for a turbine disc with a bladed rim. This blank comprises a hollow, disc-shaped casing, generally designated by the numeral 23, formed by two spaced-apart metallic discs 20 and 21 joined at their peripheral edges by a sheet-metal ring 22. The ring 22 is provided with openings for the reception of one end of blades 24, which extend somewhat into the casing 23. The casing 23 is filled with metallic powder 25 which will thus surround the inserted blade ends. The powder 25 in the casing 23 is then de-gassed, after which the casing is hermetically sealed and isostatically hot-pressed in a conventional manner. After the pressing operation, any necessary machining of the casing and the transition between the casing and the blades is carried out. After machining of the radially outer blade ends, a ring 26 is arranged around the blade ends. This ring can consist of a solid ring which is joined to the blades 24 by welding, for example diffusion welding. It is also possible to manufacture the ring 26 by applying an annular casing containing metallic powder around the blade ends and with the blade ends inserted into the casing. By an isostatic hot-pressing operation this powder-containing casing is formed into a ring which is joined to the radially outer ends of the blades 24.

In one example of the manufacture of a blade ring for an axial turbine by the method described above with reference to FIGS. 1 to 3, the sheet metal casings 4a and 4b were made from carbon steel having a thickness of about 1 mm, and the blades 3 were made from an alloy steel containing about 12 percent by weight of chromium. The ends of the blades 3 projected about 10 mm into the casings 4a and 4b. The powder used for filling the casings 4a and 4b had the same composition as the alloy steel from which the blades 3 were made, and had a particle size of less than 1 mm. The assembly of blades, casings and powder was isostatically pressed at a pressure of 150 MPa and a temperature of 1180° C. for three hours in an atmosphere of argon. At the end of this pressure sintering operation, the powder in the casings 4a and 4b had been bonded into solid rings which in turn were firmly bonded to the ends of the blades 3. Only light machining of the pressed assembly was needed to produce the finished blade ring.

What is claimed is:
1. A method of manufacturing a bladed element of a rotary fluid machine, comprising the steps of:
   providing a first annular metal wall with blade receiving openings therethrough;
   securing said first wall to at least one second metal wall to form a hollow casing;
   securing a plurality of metal blades in gas-tight manner in respective openings in said first wall, with one end of each of said blades extending through and beyond said first wall;
   filling said casing with metal powder which surrounds said one end of each of said blades within said casing;
   hermetically sealing said casing with said one end of each of said blades extending into the hollow interior of said casing; and
   hot isostatically pressing said filled and sealed casing around said one end of each of said blades to form said casing, said powder and said one end of each of said blades into a bonded monolithic body.

2. The method claimed in claim 1, wherein subsequent to filling said casing with said powder and prior to hermetically sealing said casing, said casing and the powder contained therein are de-gassed.

3. The method claimed in claim 1 or 2 for manufacturing a bladed element of ring shape, wherein said element comprises two of said hollow casings of annular shape disposed in spaced-apart relationship, each of said blades having one end disposed in one of said casings and its other end disposed in the other of said casings.

4. The method claimed in claim 1 or 2 for manufacturing a bladed element in the form of a disc with a bladed periphery, wherein said casing comprises a sheet-metal ring forming said first wall and two spaced-apart discs secured in gas-tight manner to said ring.

5. The method of claim 1 or 2, wherein said securing of said plurality of metal blades occurs prior to said securing of said first wall.

* * * * *